United States Patent
Altberg et al.

(10) Patent No.: US 9,836,767 B2
(45) Date of Patent: *Dec. 5, 2017

(54) SYSTEMS AND METHODS TO FACILITATE REAL TIME COMMUNICATIONS AND COMMERCE VIA ANSWERS TO QUESTIONS

(71) Applicant: YELLOWPAGES.COM LLC, Tucker, GA (US)

(72) Inventors: Ebbe Altberg, Mill Valley, CA (US); Scott Faber, San Francisco, CA (US); Ron Hirson, San Francisco, CA (US); Sean Van Der Linden, Berkeley, CA (US)

(73) Assignee: YELLOWPAGES.COM LLC

( * ) Notice: Subject to any disclaimer, the term of this patent is extended or adjusted under 35 U.S.C. 154(b) by 0 days.

This patent is subject to a terminal disclaimer.

(21) Appl. No.: 15/212,630

(22) Filed: Jul. 18, 2016

(65) Prior Publication Data

US 2016/0328750 A1 Nov. 10, 2016

Related U.S. Application Data

(63) Continuation of application No. 12/101,098, filed on Apr. 10, 2008, now Pat. No. 9,424,581.

(Continued)

(51) Int. Cl.
*H04L 12/66* (2006.01)
*G06Q 30/02* (2012.01)
(Continued)

(52) U.S. Cl.
CPC ....... *G06Q 30/0273* (2013.01); *G06Q 20/102* (2013.01); *G06Q 30/02* (2013.01);
(Continued)

(58) Field of Classification Search
CPC .... G06Q 50/01; G06Q 30/02; G06Q 30/0277; G06Q 30/0241; G06Q 30/0273;
(Continued)

(56) References Cited

U.S. PATENT DOCUMENTS 4,963,995 A 10/1990 Lang
7,797,345 B1 9/2010 Martino et al.
(Continued)

FOREIGN PATENT DOCUMENTS

KR 2006050484 A 5/2006

OTHER PUBLICATIONS

Cashmore, Pete, "Jaxtr—Free MySpace Phone Calls," located at http://mashable.com, Dec. 14, 2006.
(Continued)

*Primary Examiner* — Asad Nawaz
*Assistant Examiner* — Najeebuddin Ansari
(74) *Attorney, Agent, or Firm* — Alston & Bird LLP

(57) ABSTRACT

Methods and systems to facilitate real time communications and commerce via answers presented to questions. One embodiment includes one or more web servers to receive from a second user an answer to a question of a first user, and to present the answer with a communication reference of a connection provider to a third user; a session border controller of the connection provider to interface with a packet switched network; and one or more telecommunication servers of the connection provider coupled with the session border controller to connect the third user to the second user for real time communications in response to a request made via the communication referenced. One embodiment includes: receiving from a second user an answer to a question of a first user; and presenting to a third user the answer with a reference for requesting fee-based content from or real time communications with the second user.

20 Claims, 17 Drawing Sheets

Related U.S. Application Data

(60) Provisional application No. 60/911,041, filed on Apr. 10, 2007, provisional application No. 60/944,755, filed on Jun. 18, 2007.

(51) Int. Cl.
*H04L 29/06* (2006.01)
*G06Q 20/10* (2012.01)
*G09B 5/12* (2006.01)
*H04L 12/58* (2006.01)
*G06Q 50/00* (2012.01)

(52) U.S. Cl.
CPC ..... *G06Q 30/0241* (2013.01); *G06Q 30/0277* (2013.01); *G09B 5/125* (2013.01); *H04L 51/046* (2013.01); *H04L 65/403* (2013.01); *G06Q 50/01* (2013.01)

(58) Field of Classification Search
CPC ......... H04L 51/32; H04L 67/02; H04L 51/04; H04L 65/1069; H04L 65/403; H04L 2463/102; H04L 12/1813; H04L 12/581; G06F 17/3053; G06F 17/30864; G06F 17/30873; G06F 2216/15; H04W 4/206; H04N 7/17318; H04N 21/812; H04M 15/56

See application file for complete search history.

(56) References Cited

U.S. PATENT DOCUMENTS

| | | | |
|---|---|---|---|
| 8,077,849 | B2 | 12/2011 | Altberg et al. |
| 8,295,465 | B2 | 10/2012 | Altberg et al. |
| 8,452,655 | B2 | 5/2013 | Altberg et al. |
| 8,473,386 | B2 | 6/2013 | Altberg et al. |
| 2002/0085030 | A1 | 7/2002 | Ghani |
| 2002/0086676 | A1 | 7/2002 | Hendrey et al. |
| 2003/0144895 | A1 | 7/2003 | Aksu et al. |
| 2004/0043810 | A1 | 3/2004 | Perlin et al. |
| 2005/0044238 | A1 | 2/2005 | Jacob et al. |
| 2005/0216345 | A1 | 9/2005 | Altberg et al. |
| 2005/0267766 | A1 | 12/2005 | Galbreath et al. |
| 2005/0289471 | A1 | 12/2005 | Thompson et al. |
| 2006/0004623 | A1 | 1/2006 | Jasti |
| 2006/0064404 | A1 | 3/2006 | Kishore et al. |
| 2006/0190336 | A1 | 8/2006 | Pisaris-Henderson et al. |
| 2007/0005750 | A1 | 1/2007 | Lunt et al. |
| 2007/0036131 | A1 | 2/2007 | Shaffer et al. |
| 2007/0118398 | A1* | 5/2007 | Perls ................... G06F 19/328 |
| | | | 705/2 |
| 2007/0160077 | A1 | 7/2007 | Altberg et al. |
| 2007/0219958 | A1 | 9/2007 | Park et al. |
| 2007/0291923 | A1* | 12/2007 | Hsieh ................... H04M 7/003 |
| | | | 379/265.01 |
| 2007/0294078 | A1 | 12/2007 | Kim et al. |
| 2008/0016164 | A1 | 1/2008 | Chandra |
| 2008/0228745 | A1* | 9/2008 | Markus ................. G06Q 10/10 |
| 2008/0228746 | A1* | 9/2008 | Markus ............. G06F 17/30864 |
| | | | 705/2 |
| 2008/0243586 | A1 | 10/2008 | Dohring et al. |
| 2008/0301310 | A1 | 12/2008 | Pulver et al. |
| 2009/0187459 | A1 | 7/2009 | Hayes, Jr. et al. |
| 2011/0040586 | A1 | 2/2011 | Murray et al. |
| 2013/0021951 | A1 | 1/2013 | Altberg et al. |
| 2013/0235765 | A1 | 9/2013 | Altberg et al. |
| 2013/0254317 | A1 | 9/2013 | Altberg et al. |

OTHER PUBLICATIONS

Marshall, Matt, "Jaxtr Finally Launches, an Easy Way to Phone," located at http://venturebeat.com/2006/12/14/jaxtr-finally-launches-an-easy-way-to-p-hone, Dec. 14, 2006.

Tedeschi, B. (Feb. 9, 2004). Social networks: Will users pay to get friends? New York Times. Retrieved Feb. 21, 2013.

United States Patent and Trademark Office, Notice of Allowance for U.S. Appl. No. 12/101,098, dated Apr. 26, 2016, 15 pages, U.S.A.

United States Patent and Trademark Office, Office Action for U.S. Appl. No. 12/101,098, dated Dec. 21, 2011, 18 pages, U.S.A.

United States Patent and Trademark Office, Office Action for U.S. Appl. No. 12/101,098, dated May 26, 2015, 28 pages, U.S.A.

United States Patent and Trademark Office, Office Action for U.S. Appl. No. 12/101,098, dated Oct. 9, 2012, 36 pages, U.S.A.

United States Patent and Trademark Office, Office Action for U.S. Appl. No. 12/101,098, dated Nov. 5, 2014, 18 pages, U.S.A.

Wuyts, S., Stremersch, S., Van, d. B., & Franses, P.H. (2004). Vertical marketing systems for complex products: A triadic perspective. JMR, Journal of Marketing Research, 41(4), 479-487. doi: http://dx.doi.org/10.1509/jmkr.41.4.479.47015 retrieved Mar. 22, 2013.

* cited by examiner

┌─ 141
| Create Ad                                                              [?] Help |
| Your ad is very important. Tell customers exactly what you're selling and why they should call you. Please review our Pay Per Call Ad Guidelines to ensure your ad is accepted and gets new customers calling your business today. |
| Ad Location Info |
|     Business Name: [_____]  (Sorry, no phone numbers) |
|                    ☐ Use my Account Information |
|     Address 1: [_____] |
|     Address 2: [_____]  (Optional) |
|     City: [_____] |
|     State: [-Select State- ▽] |
|     Zip Code: [____]-[____] |
|     Phone Number: ([___])[___]-[____]  Enter the number where you'd like to receive calls |
|     Fax: ([___])[___]-[____] |
| Ad Marketing Message |
| Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success |
| Examples of Promotional Offers: |
|  - Call today and get $5 off. |
|  - Free consultation – limited time. |
|  - Call now and save 10%. |
| You'll be able to include more information about your offer on the business profile page. Learn more |
| Marketing Message Line 1: [_____]  (35 characters) |
| Marketing Message Line 2: [_____]  (35 characters) |
|                                ⋮                                 |

FIG. 2

Welcome, Lisa                                    Settings | Inbox | Sign Out

| People | Jobs & Hiring | Services | Answers | My Profile | My Contacts |

Connections | Invitations | Other Contacts | Colleagues | Classmates

People Search: [          ]  [Search]  Advanced Search

---

Joe Smith (1st) ~501                         [Recommend this person]
Vice President of Program Management
San Francisco Bay Area                           Send email | Download vCard
                                                 503 ~ (☎ Call me) ($30/15 mins)
[ Profile | Recommendations | Connections ]

| | Advertisements |
|---|---|
| Current: Vice President of Program Management at ABC, Inc. | Software Design |
| Past: Direct of Program Management at EFG, Inc.  505 ~ | Definition Design and Development for an advantage. |
| Education: University of California, Berkeley | ☎ 800-325-4369 |

Connection: 118

Industry: Internet                           507 ~

Websites: www.JoeSmith.com

Public Profile URL: www.networking.com/JoeSmith

Joe Recommends
People (1)
Steve Sky
Senior Director, QA, Inc.
  "Steve did an amazing job ..."

---

Summary
Joe Smith is currently Vice President of      509 ~
Program Management at ABC, Inc.
  •
  •
  •

Joe's Connections (118)
Shared (23)
Jim Berman
Director, Engineering at ABC, Inc.
  •
  •
  •

FIG. 5

Search for Questions: [ 723 ] [Search] Advanced Search

Answers Home > Question > Venture Capital and Private Equity  /701

Lui Magarian: other questions
726 — Best in: Starting Up (3)
725 — [☎ Call Now] ($1.5 per min)
727 — [✉ Mail me]

Can VC invest in an LLC
Or would another form of incorporation be required in order to receive venture funding?
Posted 1 day ago | Flag question as ...

709 — Reply Privately | Forward to an Expert
[Answer] [Suggest Expert]

711
Rob Berman: other answers
Best in: Starting Up (3)
  Accounting (1)
715 — [☎ Call Now] ($30/15 mins)
717 — [✉ Mail me]

A VC can invest in any type of corporate structure. ←714
However, that being said it will be harder to develop an exit strategy for the VC with an LLC versus a C-Corp.
Posted 1 day ago | Flag answer as ...  /719
One exit strategy is ...  Available for $5.00 [✉ Buy now]
716 —  (121 sold; 7 comments) ★★★★☆ ←718

713
Furqn Naz: other answers
Best in:
  •
  •
  •

It is technically possible for a VC fund to invest in an LLC, however, it creates some tax issues. Many top-shelf VC firms will choose not to do the investment.
Posted 1 day ago | Flag answer as ...  /721
About tax issues ...  Available for $0.75/Min [🎧 Listen Now]
(13 sold; 5 comments) ★★★★☆

Welcome, Rob  Settings | Inbox | Sign Out
Answers Home > Question > Venture Capital and Private Equity

| | | |
|---|---|---|
| Question:<br>Posted 1 day ago | Can VC invest in an LLC<br>Or would another form of incorporation be required in order to receive venture funding? | 731 |
| My Public Answer: | A VC can invest in any type of corporate structure. However, that being said it will be harder to develop an exit strategy for the VC with an LLC versus a C-Corp. | 733 |
| My Fee-based Answer: | Price: $5.00  735  737<br>Introduction: One exit strategy is …<br>Pay-to-View Content:  739<br>Attachment: Upload File  741  743 | |
| My Audio Answer: 745 | Price: $0.75  Per Minute<br>Call me to record over the phone | Upload Audio File  747 | |
| My Live Answer: | Price: $30  Per 15 Mins  ■ On  ☐ Off | 749 |
| Mail Me for Answer: | ■ Allowed  ☐ Not Allowed  753<br>751 | |

FIG. 16

Welcome, Walter  Settings | Inbox | Outbox | Sign Out

Inbox: 1 message, 1 new message

| From | Date | Subject | Charge |
|---|---|---|---|
| Rob1 | 8/22/2006 | Rob's Personal Diet Regimen | $25.00 |

⌞763                                              ⌞761         ⌞765

⋮

SYSTEMS AND METHODS TO FACILITATE REAL TIME COMMUNICATIONS AND COMMERCE VIA ANSWERS TO QUESTIONS

CROSS-REFERENCE TO RELATED APPLICATIONS

This application is a continuation of U.S. application Ser. No. 12/101,098 filed Apr. 10, 2008, which claims priority to U.S. Provisional Application No. 60/911,041 filed Apr. 10, 2007, and U.S. Provisional Application No. 60/944,755 filed Jun. 18, 2007, which are hereby incorporated herein in their entireties by reference.

TECHNOLOGY FIELD

At least some embodiments of the disclosure relate to communication connections in general and more particularly but not limited to connecting people via answers presented to questions.

BACKGROUND

People can use telephone systems to conduct real time two-way voice communications without having to be at the same physical location. Traditional land-line based telephone systems connect one telephone set to another through one or more switching centers, operated by one or more telephone companies, over a land-line based telephone network which was typically a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form of discrete packets rather than in the traditional circuit-committed protocols of the public switched telephone network (PSTN).

Cellular communication networks allow a cellular phone to connect to a nearby cellular base station through an air interface for wireless access to a telephone network. Recent developments in wireless telephone systems allow not only voice communications but also data communications. For example, cellular phones can now receive and send messages through a Short Message Service (SMS), a Multimedia Message Service (MMS), or data communication connections. For example, web pages can be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone systems are frequently used in conducting business. Telephone numbers are typically provided in advertisements, web sites, directories, etc., as a type of contact information to reach businesses, experts, persons, etc.

The Internet provides another communication media that can also be used as an advertisement media to reach globally populated web users. For example, advertisements can be included in a web page that is frequently visited by web users. Typically, advertisements included in web pages contain only a limited amount of information (e.g., a small paragraph, an icon, etc.); and links in the advertisements are used to direct the visitors to the web sites of the advertisers for further detailed information. For certain arrangements, the advertisers pay for the advertisements based on the number of visits directed to their web sites by the links in the advertisements, or based on the number of presentations of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

A social network represents a social structure in which a network of nodes can be used to represent a network of individuals or organizations and the connections between the nodes in the network represent the direct social connections. Web sites can be used to register the social connections of members of a social network and provide features such as automatic address book updates, viewable profiles, services to introduce members to each other to make new social connections, etc. Some internet social networks are organized around business connections; and some internet social networks are organized around common interests.

SUMMARY OF THE DESCRIPTION

Methods and systems to facilitate real time communications and commerce via answers presented to questions are described here. Some embodiments are summarized in this section.

One embodiment includes: one or more web servers to present a question received from a first user to a plurality of users, to receive an answer to the question from a second user, and to present the answer with a communication reference of a connection provider to a third user; a session border controller of the connection provider to interface with a packet switched network; and one or more telecommunication servers of the connection provider coupled with the session border controller to connect the third user to the second user for real time communications in response to a request made via the communication referenced.

In one embodiment, a method includes: presenting to a plurality of users a question received from a first user; receiving an answer to the question from a second user; and presenting the answer to the question with a communication reference to a third user via a data communication server. The communication reference can be used to request fee-based communications from the second user.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 2 illustrates a user interface for the creation of an advertisement according to one embodiment.

FIG. 5 illustrates an example of providing advertisements via a social network according to one embodiment.

FIG. 15 shows a user interface to present answers to facilitate real time communications and content transaction according to one embodiment.

FIG. 16 shows a user interface to receive answers from a user according to one embodiment.

DETAILED DESCRIPTION

Figure 1:
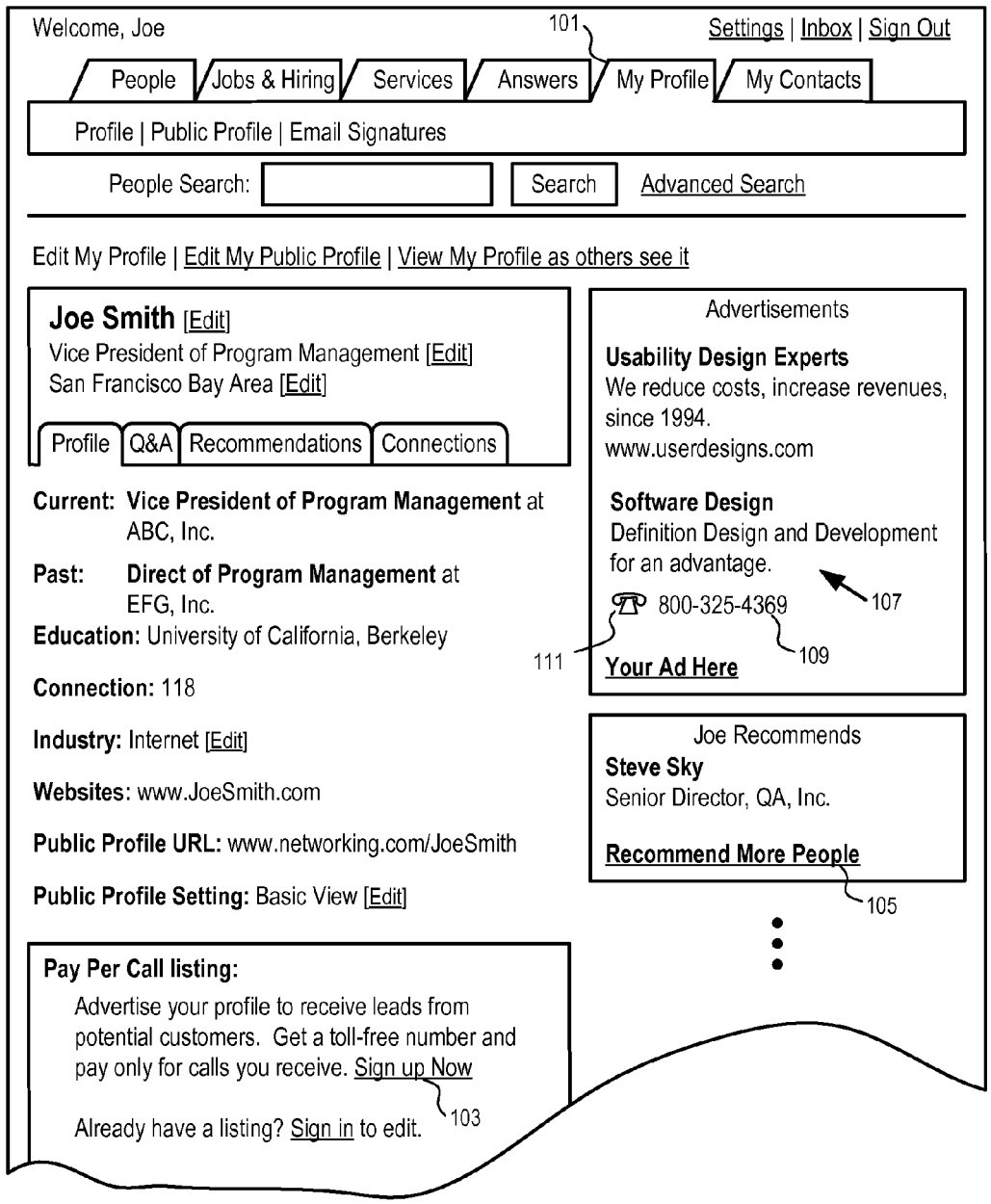
FIG. 1 shows an example of a user interface to integrate a social network and an advertisement network.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which nay be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In one embodiment, a social network is used to establish a measure of trustworthiness between people, such as advertisers and their customers, service providers and their customers, sellers and their customers, etc.

In one embodiment, a social network is used to establish trust between service providers/sellers and customers/buyers. The degrees of separation in a social network can be used as a measurement of trustworthiness in searching for service providers/sellers. For example, in a marketplace of human-expertise a social network allows a customer to search for service providers (e.g., therapists) who are within a number of degrees of separation from the customer in the social network. For example, the customer may limit the search of therapists to those who are known to someone the customer knows (e.g., within two degrees of separation in the social network).

In one embodiment, the social network is used to verify credentials of people involved in a marketplace, such as a human-expertise marketplace. For example, the social network can be used to verify credentials of a seller/service provider/advertiser and thus to increase the trust in the person the customer is looking to talk to. For instance, a customer may see that a therapist went to a college for her degree; and the social network can display testimonials from her professors and classmates that she indeed went to that college and indeed is high quality.

In one embodiment, a social network is integrated with a service market place in which services are provided via a connection for real time communications, such as a telephonic connection, an instant messaging connection for text, voice and/or video communications, etc.

In one embodiment, a social network is integrated with an advertisement system which allows customers to assess the trustworthiness of the advertisers.

FIG. 1 shows an example of a user interface to integrate a social network and an advertisement network. In FIG. 1, a user (e.g., Joe Smith) of the social network can select the "My Profile" tab (101) to view/edit the member profile of the user.

In one embodiment, the social network includes a database that contains data representing the relations between a set of members. In a social network, a member may be represented by a node; and a direct relation between two members is represented by a connection. After the direct relations between members are specified, the database can be used to determine the relations between members that are indirectly connected. For example, the member may identify a friend's friend via the service of the database.

In one embodiment, the number of connections along the shortest path in the social network between two members is considered the degree of separation between the two members. There may be more than one shortest path between the two members.

In one embodiment, the database of the social network further includes information about the members, which are considered the profile data of the members.

For example, a member may edit his/her profile data via the user interface illustrated in FIG. 1. The profile data can include the name of the member, the location of the member, the current and/or past job title of the member, the industry the member is specialized in, the website of the member, the education experiences of the member, etc.

In one embodiment, at least part of the profile data is public; and the public data is visible to other members and/or non-members. In one embodiment, the member may specify a setting to selectively classify certain information as private profile data; and the access to the private profile data is limited according to a set of rules.

In FIG. 1, the user interface also allows the member to sign up (103) as advertisers to promote their businesses and/or services. In one embodiment, the system presents advertisements for the advertiser; and the advertiser is charged an advertisement fee when a customer's incoming call is connected to the advertiser via the advertisement. In one embodiment, the advertiser is not charged an advertisement fee if the presentation of the advertisement does not cause a customer to call the advertiser. Alternatively or in combination, the connection provider charges a commission fee when the advertiser sells services and/or products over the communication connection (e.g., telephone connection) provided by the connection provider.

When an advertiser is identifiable as a member of the social network, the social network can be used to provide information about the advertiser and/or to establish the trust between a potential customer and the social network. The potential customer may use the social network to find the connections of the advertiser with other peoples, to find the recommendations, feedback, comments made about the advertiser by the others who the customer can trust, etc. Further, if the customer is also a member of the social network, the customer may determine the social distance from the advertiser and find someone them may know in common for an opinion about the advertiser.

In FIG. 1, the user interface includes a link (105) which allows the member to recommend people who the member knows. In one embodiment, the comments, feedback, ratings of the prior customers are weighted or labeled or sorted based on the social distances between the customers and the advertiser/seller/service provider. Using the social network, a potential customer can find a personalized view of the information based on the social relations among the potential customer, the advertiser/seller/service provider and the prior customers who provided the comments, ratings, feedback, recommendations, etc. For example, the trustworthiness of the comments, ratings, feedback, and recommendations can be rated, sorted and presented according to the social network structure (e.g., social distances, connections of a member of the social network, recommendations made by a member of the social network, etc.). For example, a member may assign a value for a trustworthiness indicator to members who are directly connected to the member in the social network structure and using the social network the system can evaluate a value for the trustworthiness for indirectly connected members. Separate indicates may be used for feedback, recommendations, etc. In one embodiment, the social network system collects information for the automated evaluation of a value for a trustworthiness indicator of a friend of member of the social network structure, which can be further used to compute the value for the trustworthiness indicator for indirectly connected members. For example, a member may rate the trustworthiness of feedbacks, recommendations, ratings, etc. of other members. In one embodiment, the social network system uses the trustworthiness indicator to sort information such as feedbacks, recommendations and/or to select advertisements for presentation. The system may or may not display the value of the trustworthiness indicator to the users.

In FIG. 1, advertisements are delivered to the member based on the profile information the social network has about the member and/or other information in one embodiment. For example, the advertisement (107) includes a phone number (109) and an icon (111), which can be used to request a connection provide to provide a telephone connection between the advertiser and the member.

In one embodiment, the phone number (109) is assigned to the advertisement (107) by a connection provide for tracking the response to the advertisement. When the phone number (109) is called by a customer, the call is connected to the connection provider, which determines the phone number of the advertiser based on the phone number (109) that is dialed to reach the connection provider. The connection provider then further connects the call to the advertiser. In one embodiment, the advertiser is charged an advertisement fee per the connection of the customer call to the advertiser. Alternatively or in combination, the advertiser may be charged based on the number of presentations of the advertisement made on behalf of the advertiser and/or based on a subscription agreement.

In one embodiment, when the icon (111) is selected, the connection provider calls back the member and calls the advertiser separately to connect the member and the advertiser. In one embodiment, when the icon (111) is selected, a VoIP application is used to connect the member to the advertiser via the connection provider. In another embodiment, the VoIP application tracks the calls made through the advertisements to bill the advertiser accordingly. In one embodiment, when the icon (111) is selected, a VoIP application is used to call the phone number (109) to request the connection provider for a connection to the advertiser.

FIG. 2 illustrates a user interface for the creation of an advertisement according to one embodiment. The user interface may be presented via web in a web browser.

In FIG. 2, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via as text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g. present an electronic coupon via an animation). For example, a Java apple can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 2, the interface (141) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 3:
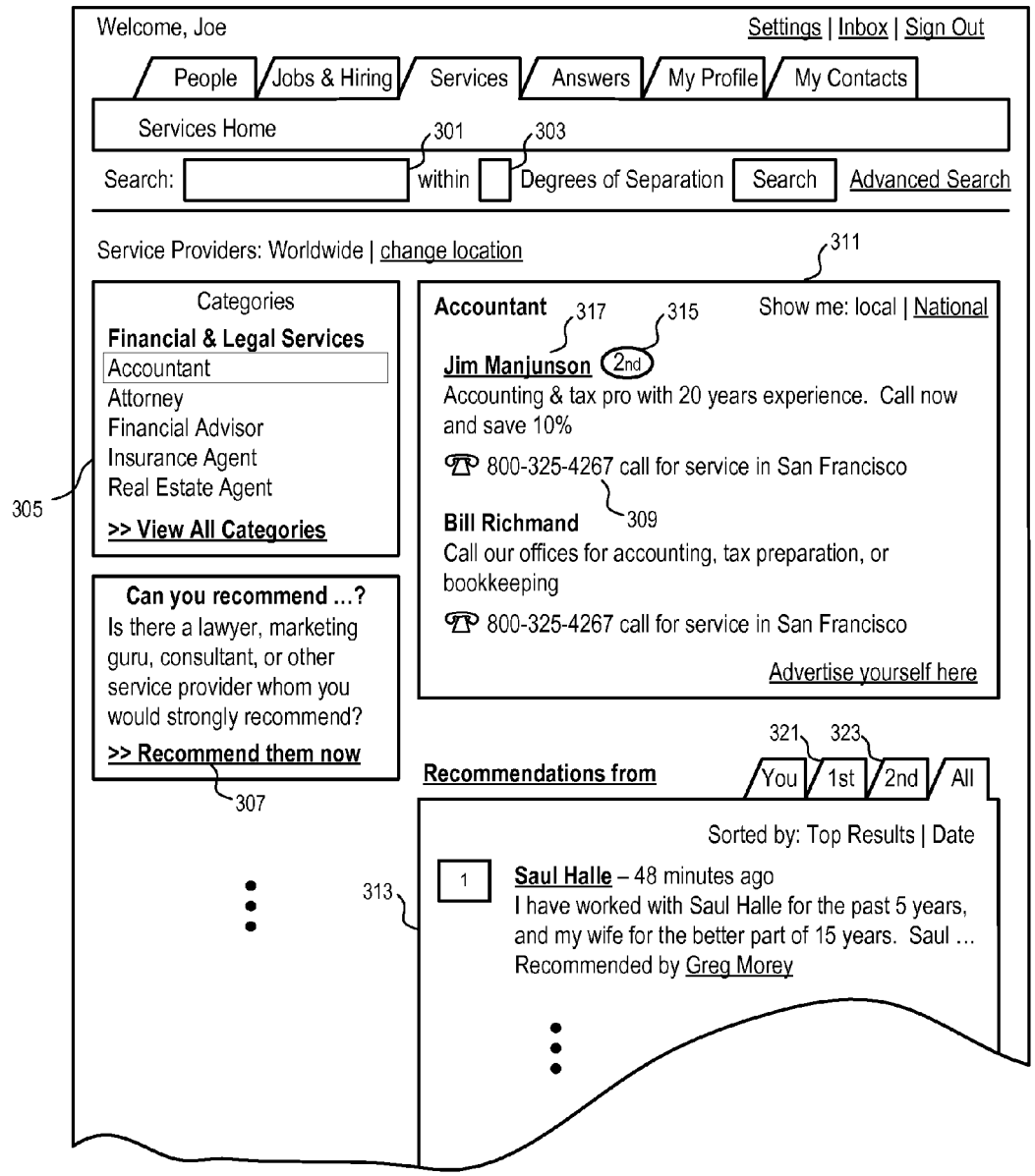
FIG. 3 illustrates an interface which can be used by a member of a social network to locate services providers according to one embodiment.

FIG. 3 illustrates an interface which can be used by a member of a social network to locate services providers according to one embodiment. In FIG. 3, the entry box (301) can be used to specify a search criterion one or more keywords); the entry box (303) can be optionally used to specify a criterion for degrees of separation in the social network. For example, the member may search for an account who is within 2 degrees of separations from the member in the social network.

In FIG. 3, a member may also browse through a directory structure (e.g., categories of services) to locate a service provider. For example, in response to the member selecting the "accountant" category advertisements (311) and recommendations (313) are displayed. The advertisements (311) can be selected based on matching the location of the service providers and the location of the member, the bid prices of the advertisements, etc. In one embodiment, advertisers can specify the bid prices for the advertisement fees which are charged when the customer calls the phone number (e.g., 309) to reach the advertiser.

In one embodiment, when the advertiser is also a member of the social network, the advertisement includes an indication (315) of social distance between the advertiser and the user of the interface. Further, in one embodiment, a link (317) to the profile of the advertiser is provided to allow the customer to research the advertiser before calling the advertiser.

In FIG. 3, the recommendations from the members of the social network for the service providers in the selected category (e.g., accountant) are presented based on the social distances to those who make the recommendations. For example, in FIG. 3, the member can select the tab (321) to view the accountants recommended by the friends of the member and select the tab (323) to view the accountants recommended by the friends of friends of the member.

In FIG. 3, a link (307) can be selected to request a user interface for making a recommendation for a service provider. In one embodiment, the system allows a member to recommend any service providers. Alternatively, a member may be limited to make recommendations for service providers who have direct connection with the member, who have provided services to the member via the system, and/or who are within a certain distance from the member in the social network.

Figure 4:
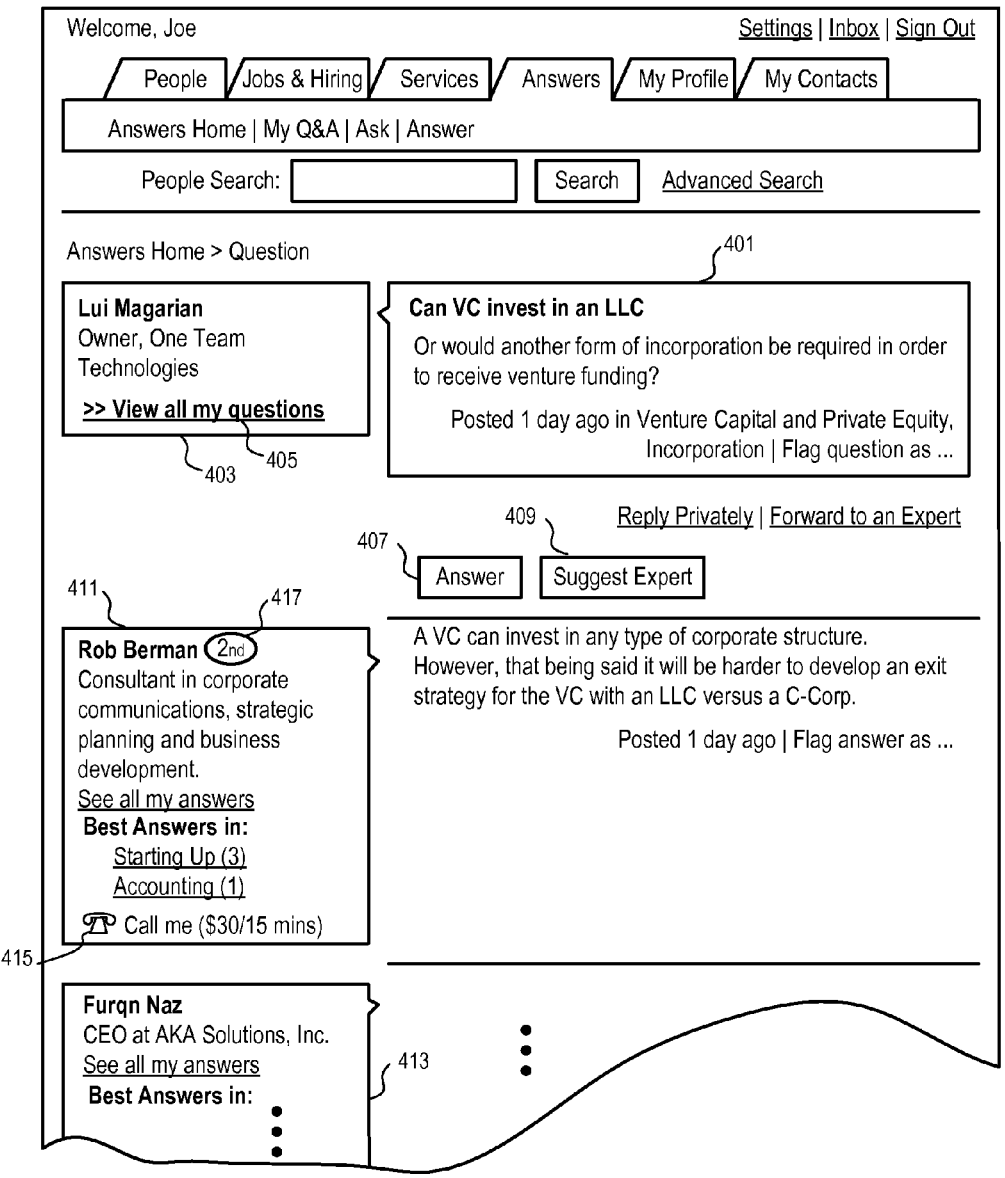
FIG. 4 illustrates a system to connect customers to experts according to one embodiment.

FIG. 4 illustrates a system to connect customers to experts according to one embodiment in FIG. 4, a member of the social network can post a question that can be answered by other members of the social network. In one embodiment, the question is posted in a category (e.g., a business area or technology field) for answers from members who are specialized in the category (e.g., due to their past experiences, education, or current job positions).

In FIG. 4, the user (Joe) is viewing a question (401) which is posted by another member (Lui Magarian), whose profile is summarized in a banner (403). The banner (403) can be selected to view further details about the member (Lui Magarian) who asked the question. For example, a link (405) can be selected to see other questions asked by the member (Lui Magarian)

In FIG. 4, the user (Joe) can select the icon (407) to provide an answer (407) or the icon (409) to suggest an expert to answer the question (401). Alternatively, the user (Joe) may chose to reply to question privately, or forward the question to an expert the user (Joe) knows.

In FIG. 4, the user (Joe) can also see a number of existing answers to the question posted by other members (e.g., Rob Berman, Furqn Naz). In FIG. 4, banners (411, 413) are displayed to show the brief summaries of the members who provided the existing answers.

For example, the banner (441) shows that Rob Berman, who is a consultant in corporate communications, strategic planning and business development, has provided a number of best answers categories such as "starting up", "accounting", etc.

In one embodiment, the answers can be rated by the member who posted the question (and/or other members who reviewed the answers). Thus, the quality of the answers provided by the experts can be rated and ranked. Such feedback provides an evidence of credentials of the experts in providing advices in certain fields.

In FIG. 4, the icon (415) also shows that the expert is currently available to provide advices over a real time communication connection. In one embodiment, when the icon (415) is selected, the user (Joe) will be called back for a connection with the expert (Rob Berman) who charges a customer $30 for a session that is up to 15 minutes for advices provided over the connection. In one embodiment, when the icon (415) is selected, a VoIP application program is used to call the expert (Rob Berman) for a connection for instant messaging in text, voice and/or video. In one embodiment, when the icon (415) is selected, an application program is used to dial the phone number of the expert (Rob Berman), or a phone number of the connection provider which is temporarily assigned to the advertisement of the expert (Rob Berman). In one embodiment, a phone number of the connection provider (with or without extension) is assigned to the expert (Rob Berman) and displayed in the banner (441).

In one embodiment, the connection provider tracks the calls and/or the duration of the communications to bill the customer and compensate the expert. In one embodiment, the connection provider tracks the calls through being in the path of the communication connection (or in the path of the call for the communication connection). In one embodiment, the connection provider uses the VoIP client application program to track the calls and/or duration.

In FIG. 4, the icon (417) indicates that the social distance between the user (Joe) and the expert (Rob Berman) in the social network. Thus, the banner (411) not only identifies the member who provided the answer, but also provides an advertisement for the expert in one embodiment, the expert is charged an advertisement fee when a customer is connected to the expert through the advertisement. The advertisement fee may be a fixed, flat fee, or a fee based on a bid price of the advertiser, such as a fixed bid or a maximum bid. Alternatively or in combination, the expert may be charged a commission fee when the customer makes a purchase from the expert over the communication connection. The commission fee may be a fixed, flat fee, or a percentage of the customer spending. In one embodiment, the expert may charge the customer a fixed or flat fee for a communication session which is independent of the actual duration of the communication session (which may have a predetermined limit on the maximum duration, such as $30 for a session up to 30 minutes). Alternatively, the expert may charge the customer on an ongoing basis based on a rate (e.g., $2 per minute or $50 per hour).

FIG. 5 illustrates an example of providing advertisements via a social network according to one embodiment. In FIG. 5, a user (Lisa) is viewing the profile of a member within a sub-network that is accessible to user. For example the user can view the direct contacts of the user within the social network.

In FIG. 5, a profile of a member (Joe Smith) is displayed. The icon (501) indicates that the user (Lisa) has a direct connection with the member (Joe Smith). The icon (503) indicates that the member (Joe Smith) is also an expert whose services are being advertised by the system.

In one embodiment, the icon (503) includes an indication of current availability of the expert (Joe Smith) for real time communications. When the member is not currently available, the appearance of the icon (503) can be changed to indicate that the user may request an appointment with the expert (Joe Smith) for a future connection, or request the system to send a notification to the expert.

In FIG. 5, when the user (Lisa) selects the icon (503), a connection provider connects the user (Lisa) and the expert (Joe Smith). The connection provider also charges the user (Lisa) on behalf of the expert (Joe Smith).

In one embodiment, the user can view at least the public profile of any member of the social network. For example, the social network can make the public profile of its members available to the public. When the member has a listing, the public profile can also show the listing on behalf of the member and/or the communication references to reach the member via a connection provider. The communication references can be a traditional telephone number with or without extension, as session initiation protocol (SIP) uniform resource identifier (URI), a VoIP user identifier, a member ID, etc.

In FIG. 5, targeted pay per call advertisements (505) can be presented to the user based on the profile data of the user (Lisa) and/or the profile data of the member (Joe Smith). When the advertisers of the advertisements are members of the social network, information based on the social network can be presented to show the trustworthiness of the advertisers. Banners (507 and 509) show the recommendations made by the member (Joe Smith) and the connections to common friends of the user (Lisa) and the member (Joe Smith). A customer may judge the trustworthiness of an advertiser via the recommendations of other persons made by the advertiser and the people associated with the advertiser.

Figure 6:
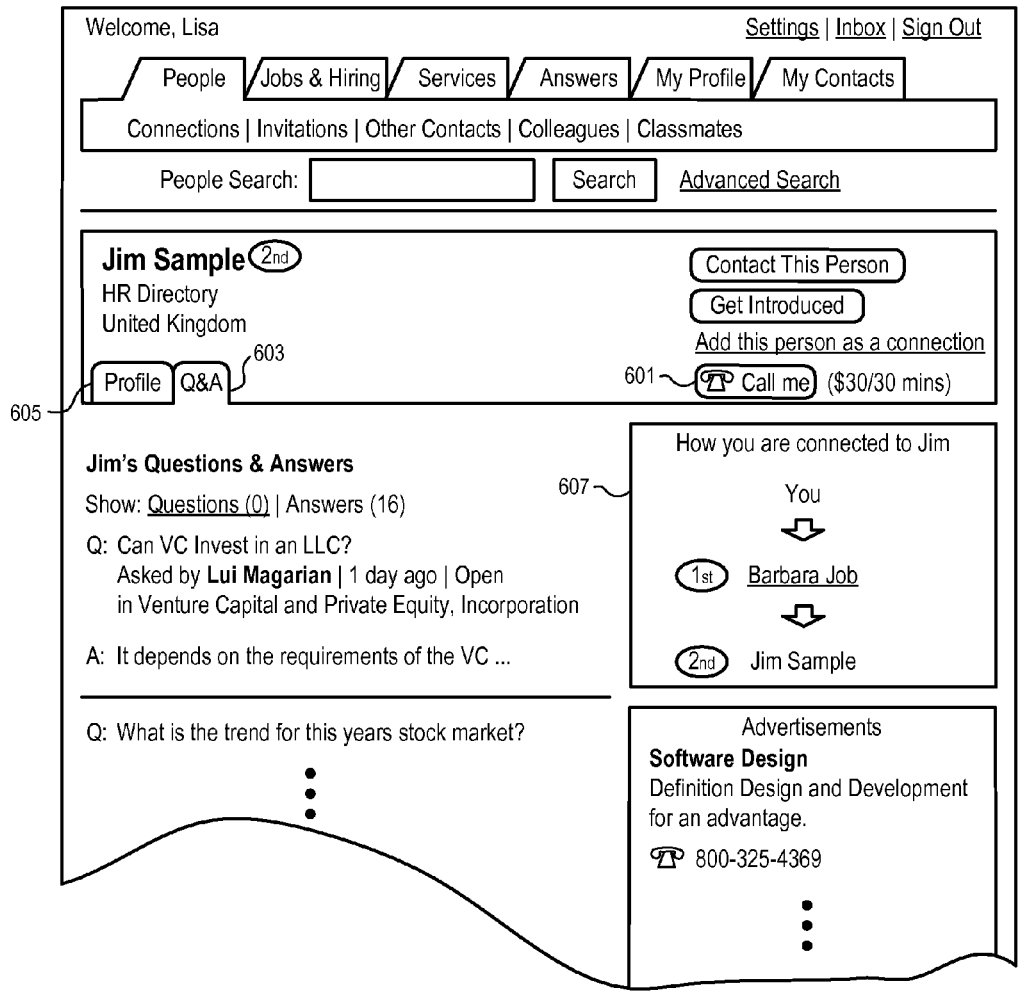
FIG. 6 illustrates an example of presenting an advertiser via a social network according to one embodiment.

FIG. 6 illustrates an example of presenting an advertiser via a social network according to one embodiment. In FIG. 6, a communication reference, such as a call button (601), is presented with a brief summary of the profile of the advertiser, which may be an expert, advisor, seller, entertainer, information provider, consultant, etc. Alternatively or in combination, a toll free telephone number or local telephone number may be presented with the brief summary. In one embodiment, the communication reference is assigned to the advertiser to be published as the contact information of the advertiser. The connection provider is between the path of a communication connection, or a call for the communication connection, between a caller and the advertiser to provide services such as filtering out callers who are not serious, blocking calls that are in the callable hours of the advertiser, processing payments for the advertiser, etc.

In FIG. 6, the tab (603) can be selected to view the questions asked by the advertiser and the answers provided by the advertiser, which provides an evidence of the competence of the advertiser as an expert in certain areas.

In FIG. 6, the tab (603) can be selected to view more detailed profile data of the advertiser, which may include the current employer, job title, field of business, technology, industry, education, credentials, recommendations, ratings, customer feedbacks, etc.

In FIG. 6, the banner (607) shows how the user (Lisa) is connected to the advertiser (Jim Sample). For example, the user (Lisa) is connected to the advertiser (Jim Sample) in the social network via one common friend (Barbara job). Thus, the user (Lisa) may ask the common friend (Barbara Job) for information about the advertiser (Jim Sample). For example, the user (Lisa) may trust the advertiser (Jim Sample) based on the direct connection between the advertiser (Jim Sample) and the friend (Barbara Job) of the user (Lisa).

In one embodiment, members of a social network may indicate the areas of interest for which they might receive advertisements. In one embodiment, the advertisers may reward the members for real communications over connections provided by the connection providers. In one embodiment, the advertisers may use the social distance and/or other information from the social network to selectively target the delivery of advertisements and/or select the audiences for their advertisement pitches. Both the advertisers and the customers can use the social network to judge the trustworthiness of the other party.

In one embodiment, an advertiser can target pay per call advertisements to members of a social network based on the accessible profile data of the members. The advertiser is charged an advertisement fee when the member calls the advertiser via the connection provider.

In one embodiment, the social network can be used to facilitate real time communications between indirectly connected members. In one embodiment, a member of the social network may be allowed to browse the network to view profiles of other members who are within a threshold distance to the member in the social network (e.g., within 3 degrees of separation). In one embodiment, a member of the social network may also be allowed to browse the network to view a limited portion of profile data of other members who are more than the threshold distance to the member in the social network (e.g., a portion of the profile without names of other members who are beyond 3 degrees of separation from the member). Further, the public profile of the members can be published for access by non-members in one embodiment.

In one embodiment, a member of the social network can view the contact information of direct friends who are directly connected to the member in the social network (e.g., the access of contact information is limited to members within one degrees of separate). The member may use the social network to explore indirectly connected members (e.g., a friend of a friend) and request introductions or invitations to connect.

In one embodiment, the social network provides communication references which can be used to request a connection provider to provide a connection between two indirectly connected members for real time communications (e.g., telephone connections, instant messaging connections for text, voice and/or video chat, etc.). The connection provider provides the connection without reveal one member's contact information to another. In one embodiment the connection provider can further provide the connection in accordance with a number of preferences of the callee of the connection. For example, the button (601) can be provided in the profile page of Jim Sample in FIG. 6 to allow the member (Lisa) to request a telephone connection to Jim Sample through the connection provider. In one embodiment, the button (601) is not specific for an advertisement and the button (601) is designed to facilitate the communications between members who are indirectly connected in the social network.

In one embodiment, a member can limit who may request the connection based on a social network preference setting. For example, one member may allow the real time communication connections for members who are within two or three degrees of separation from the member in the social network. For example, one member may limit the real time communication connections to members who are connected to the member through a particular set of friends.

In one embodiment, a member may set a price for receiving a call for real time communication connections. For example, the member may specify a flat fee for accepting a call for a telephone conversation connected by the connection provider via the social network, with or without a limit on the length of the communication session. For example, the member may specify a per minute fee for accepting a call for a telephone conversation connected by the connection provider via the social network. In one embodiment, the member may set different prices based on one or more social network characteristics, such as the social distance to the caller, being connected in the social network via a particular friend of the member, etc. In one embodiment, the prices are specified prior to the request from the caller. In another embodiment, a price can be specified by the callee after both the caller and callee are connected to the connection provider but before the connection provider bridges the connections to connect the caller and the callee.

In one embodiment, the connection provider may require that the prices are above a minimum price; and the system charges a percentage of the fees collected on behave of the callee as a commission fee. Alternatively, the communication references can be provided as a feature accessible to members who pay a subscription fee.

In one embodiment, a member can set a schedule to specify callable hours during which the member is willing to accept the calls for real time communication connections. The connection provider blocks requests for real time communication connections outside the callable hours.

In one embodiment, the connection provider assigns a phone number and/or a call button to a callee. When the phone number is dialed, or the call button is selected, the caller is connected to the connection provider before the caller is further connected to the callee. To connect the caller to the calico without revealing the contact information of the callee, the connection provider makes a separate connection to the callee and then bridges the connections to facilitate real time communications. In one embodiment, the connection provider also performs format and/or language translation to bridge the connections. For example, the connection provider can translate the text input received from one member into voice output to the other member and translate the voice input received from one member into text output to the other member. For example, the connection provider can translate voice or text input in one language received from one member into text and/or voice in another language for another member.

In another embodiment, the connection provider provides a VoIP client application to implement the preferences of the callee. For example, when a call button associated with a VoIP client application is selected, the VoIP client application is executed to initial a request in accordance of the callable schedule of the callee, the price of the callee, etc. In one embodiment, the VoIP client applications use peer to peer communications to facilitate the establishment of the communication connection.

In one embodiment, the communications references, such as a phone number, a SIP URI, a VoIP user identifier, a call button, etc., are associated with the member of the social network for requesting a communication connection with the member by someone who does not have direct contact information of the member. When the profile data of the member is presented, or when the member is presented as part of the social network, the communication references can be presented also to allow the user to request a connection with the member for real time communications. In one embodiment, the caller and callee may also provide indication through the connection for real time communications to make a direct connection in the social network between the caller and the callee. For example, the callee and/or caller may press "#00" on the phone to request a direct connection in the social network.

In one embodiment, the communications references, such as a phone number, a SIP URI, a VoIP user identifier, a call button, etc., are associated with listings of the members. The listings are advertised for the members when appropriate. The listing may be a pay per call advertisement for selling a product or service. The listing may be a listing for selling services over real time communications provided by the connection provider.

In one embodiment, the communication reference is embedded in an advertisement or a profile page to represent an address or identifier of the connection provider in a telecommunication system. When a call to the reference is made via the telecommunication system for a real time communication session, the call is connected to the connection provider. The connections provider may associate different communication references with different members, advertisers and/or advertisements so that the member/advertiser can be identified via the communication reference used to call the connection provider. After identifying the contact information of the advertiser based on the communication reference used to call the connection provider, the connection provider can further forward, bridge, conference or connect the call to the member/advertiser.

The connection provider can thus track the connections for real time communications with the advertiser, made via the communication reference embedded in the advertisement that is presented in the social network environment. The connections provided by the connection provider can be considered as communication leads provided to the advertiser via the advertisement; and the advertiser can be charged based on the delivery of leads to real time communications with customers.

In one embodiment, advertisers may specify bid prices for the communication leads received; and the presentation of the advertisement and the connection of calls can be prioritized based on the bid prices of the advertisers. In one embodiment, the advertisers may specify the rules or limits for the bid prices to allow the system to automatically determine the actual bid prices for the advertisers based on the bids of their competitors.

Examples of calls for a session for real time communications include but not limited to telephone calls made via a circuit switched network, a packet switched network, or a combination of circuit switched networks and packet switched networks, calls for a text-based chat sessions, calls for instant messaging sessions which may support communications in text, voice, and/or video, calls for an application sharing session such as common whiteboarding, screen sharing, file sharing, calls for teleporting to a meeting location in the virtual world, etc.

In some embodiments, the connection provider can also provide a channel for non-real-time communications between an advertiser and a customer, in addition to the real time communication connection, or as an alternative to the real time communication connection. In one embodiment, the connection provider can provide multiple concurrent connections for communications in multiple types of media or formats.

In one embodiment, a real time communication between two persons includes one person providing information and the other person receiving information substantially in the same time as the person providing the information, as if the two persons were in a face to face communication. Examples of communication media that support real time communications between two persons include telephone connections, instant messaging connections, etc. Alternatively, a communication from one person may be stored on a communication system until the other person is ready to obtain it, such as an email communication.

Figure 7:
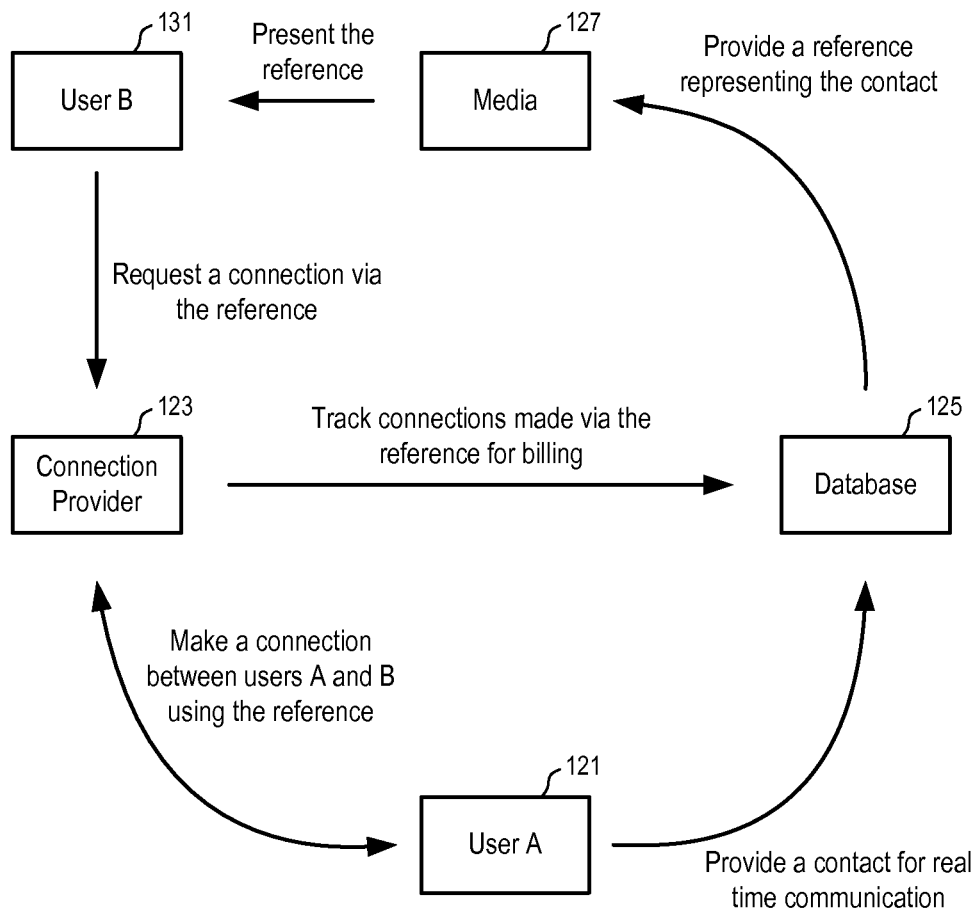
FIG. 7 shows a method to establish connections for real time communications according to one embodiment.

FIG. 7 shows a method to establish connections for real time communications according to one embodiment. In FIG. 7, user A (121) provides a contact for real time communication, such as a telephone reference of the user A. The contact can be used to establish a connection with user A (121) through a communication network. For example, the contact can be a telephone number of to landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 7, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and then make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

Figure 8:
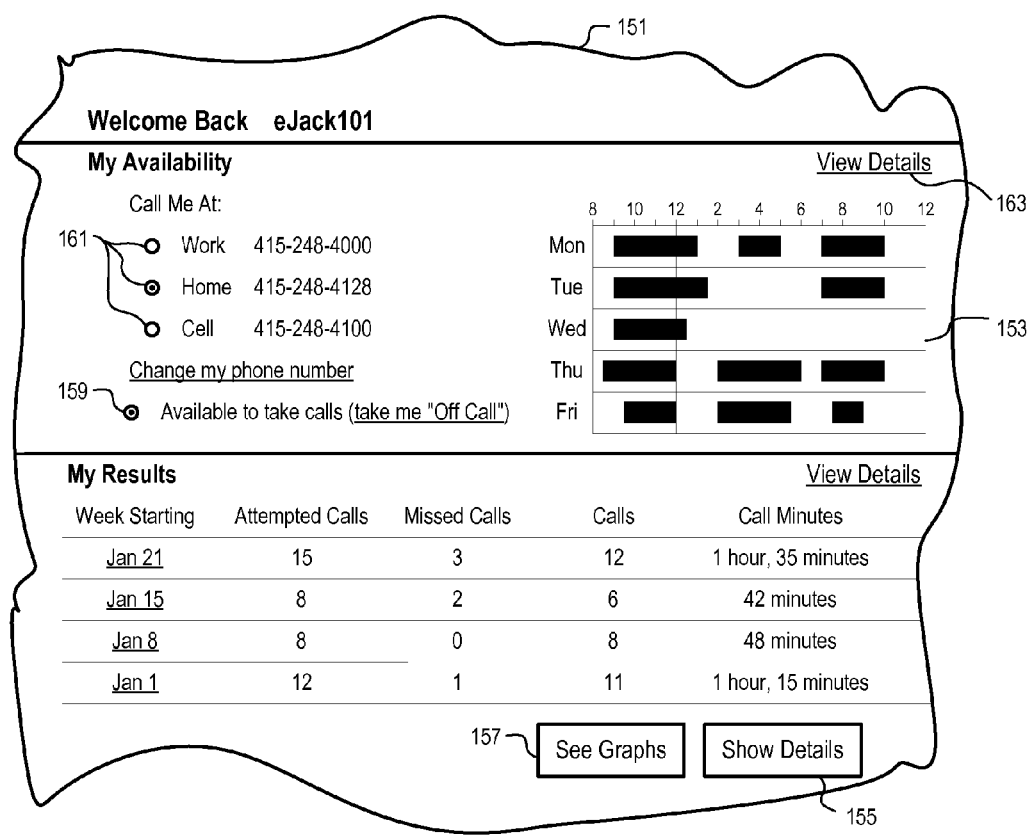
FIG. 8 illustrates an example of a user interface to manage availability for receiving phone calls according to one embodiment.

FIG. 8 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 8, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the system allows the seller to specify the schedule to receive calls; and the schedule (153) is displayed to the seller in a graphical way to help the seller to manage calls. In FIG. 8, the user interface (151) includes a link (163) which can be selected to display a user interface (not shown in FIG. 8) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 8, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call Or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement) a geographical area served by the advertisement, the demand partner who is going to present the advertisement (e.g., the success rate of the demand partner in reaching viable customers in comparison with other demand partners), etc.

Figure 9:
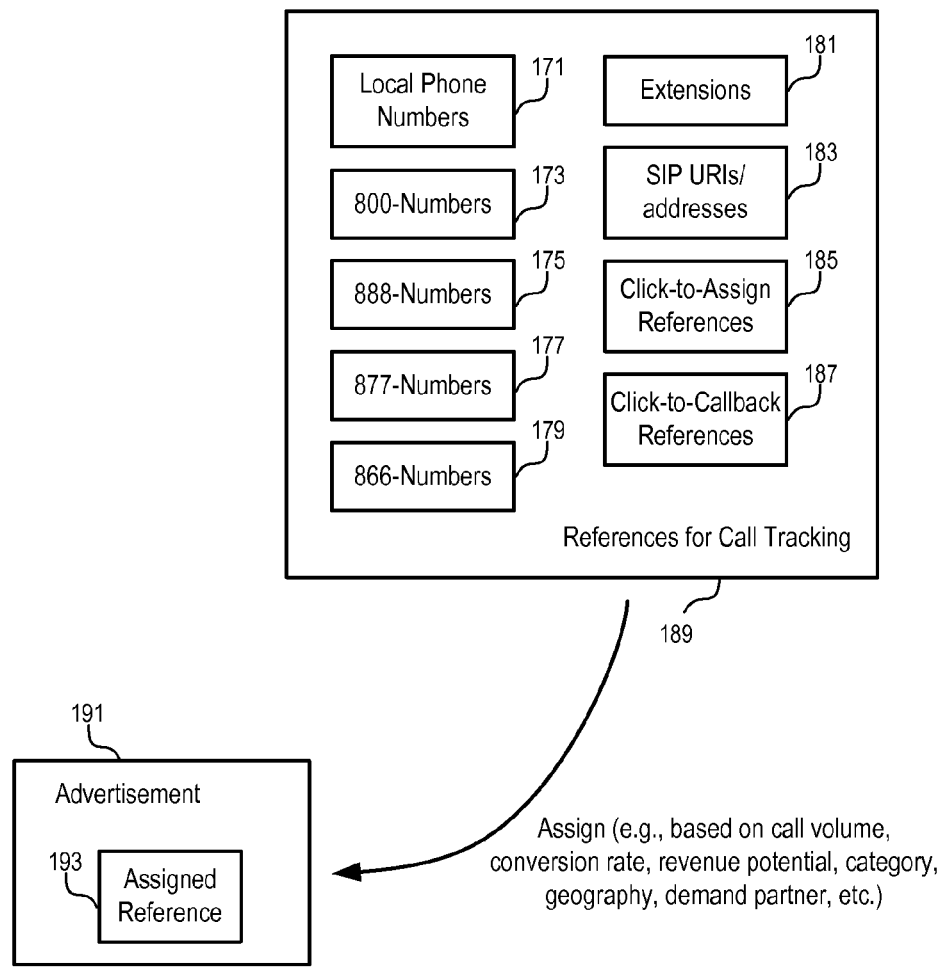
FIG. 9 shows a diagram illustrating a method to select a type of tracking mechanism with a corresponding reference for embedding in an advertisement according to one embodiment.

FIG. 9 shows a diagram illustrating a method to select a type of tracking mechanism with a corresponding reference for embedding in an advertisement according to one embodiment. In FIG. 9, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 9, a pool (189) of different types of references is maintained, such as local phone numbers (171), 800-numbers (173), 888-numbers (175), 877-numbers (177), 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, Since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner or to a web browser of a customer). For example, the tracking mechanism used in an advertisement that is to be presented is a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have as number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/ profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 10:
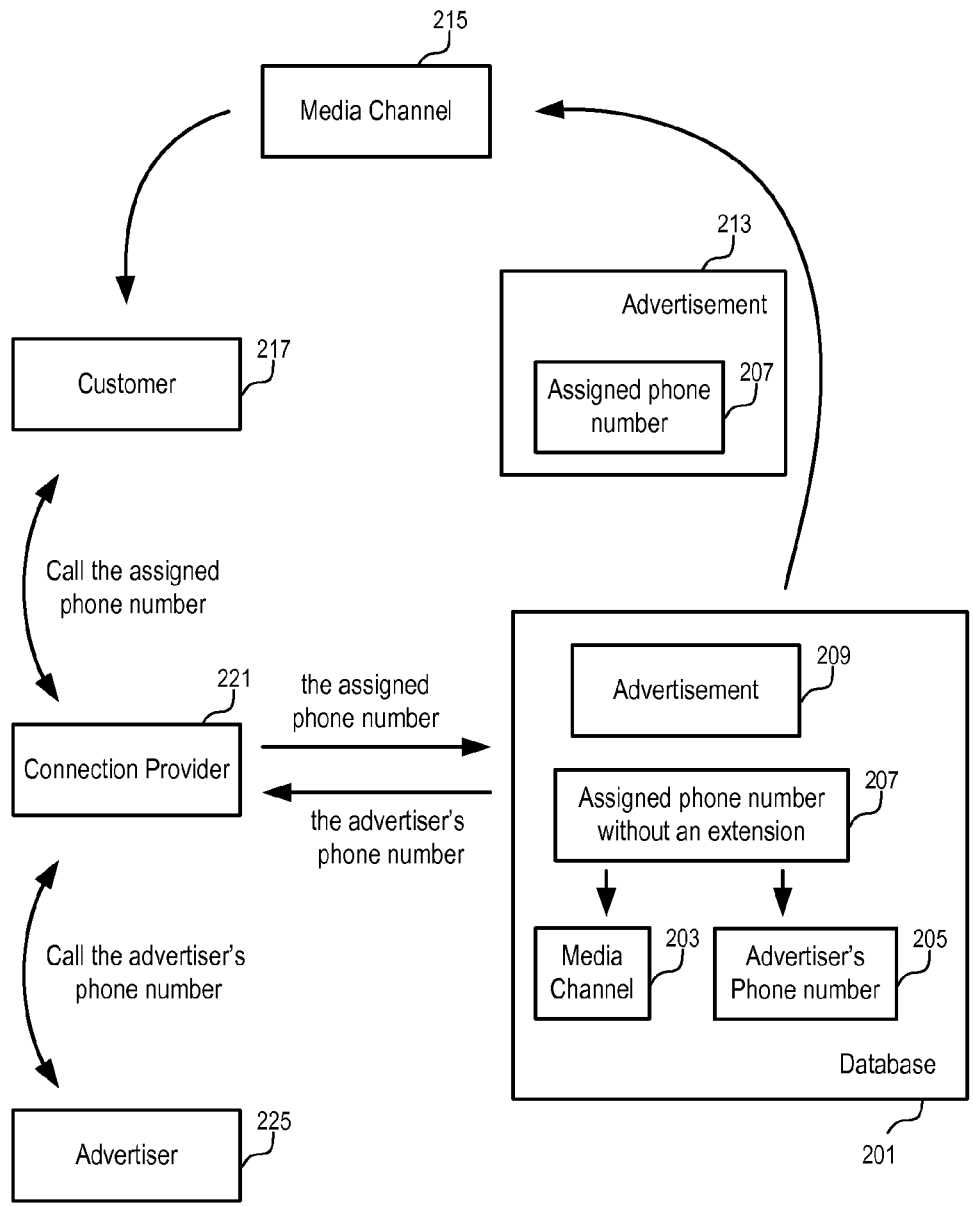
FIG. 10 illustrates an example of telephone call tracking mechanisms which can be selected according to one embodiment.

FIG. 10 illustrates an example of telephone call tracking mechanisms which can be selected according to one embodiment.

In FIG. 10, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 11:
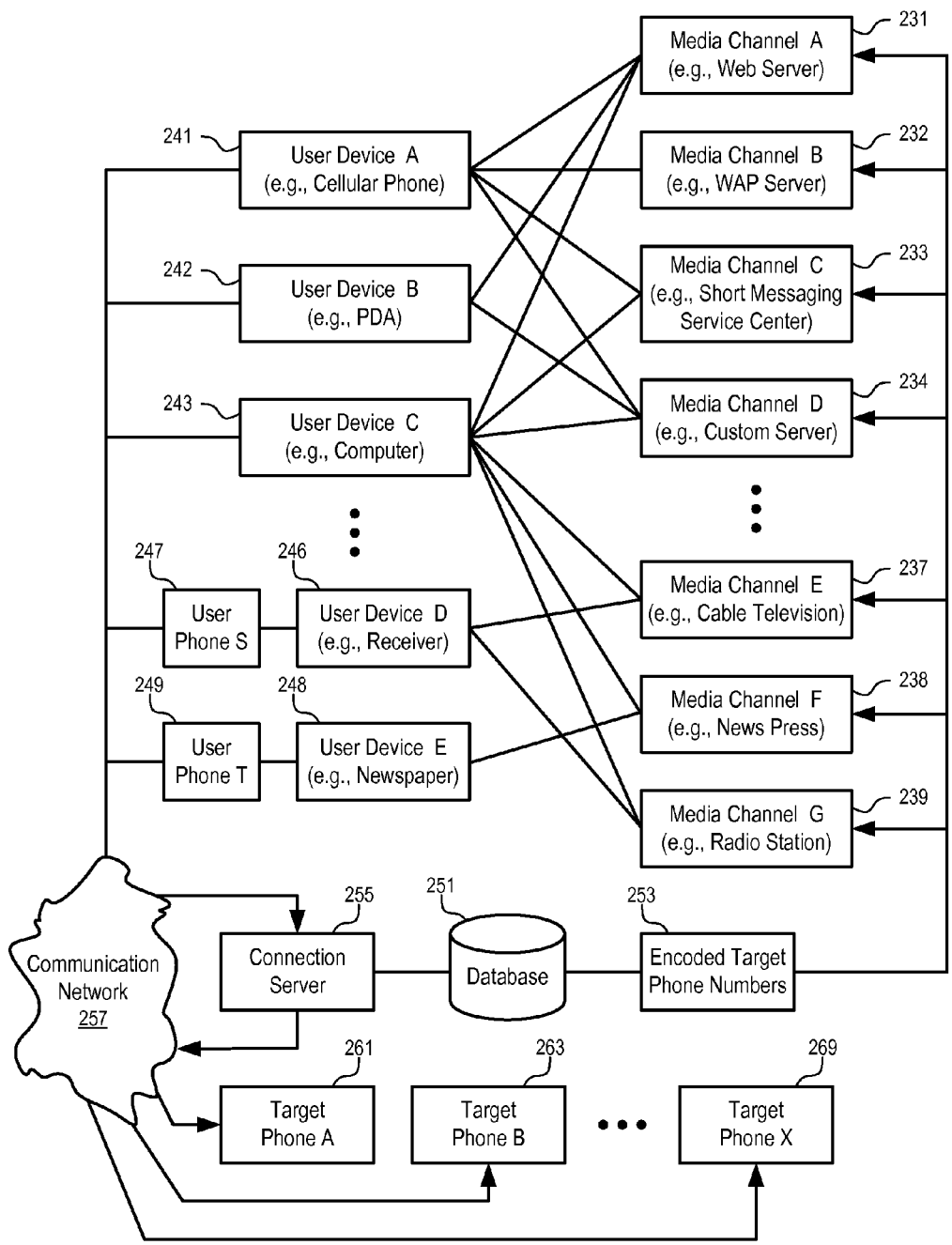
FIG. 11 shows a diagram of as system to make and track phone connections according to one embodiment.

FIG. 11 shows a diagram of a system to make and track phone connections according to one embodiment. In FIG. 11, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number thy decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 11, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection wryer with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 12:
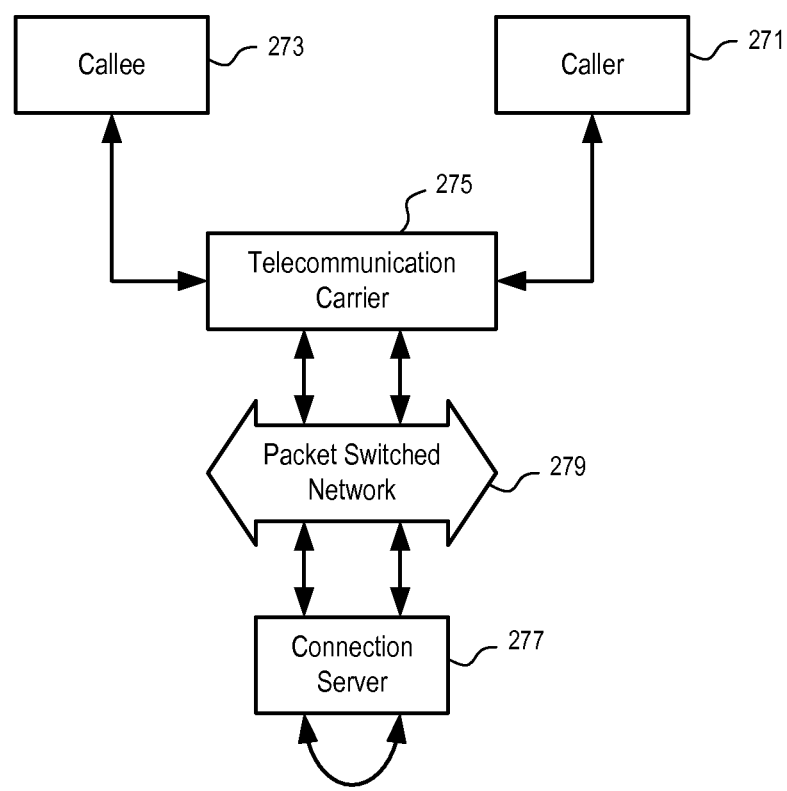
FIG. 12 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 12. In FIG. 12, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 12, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 13:
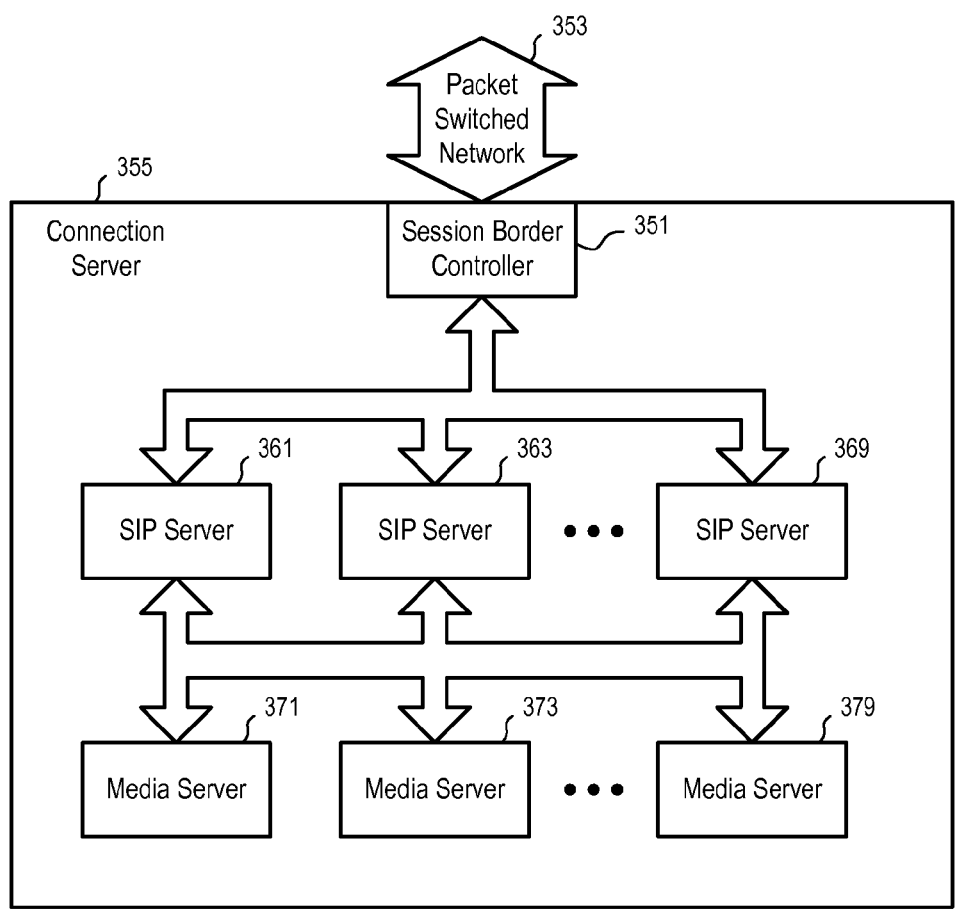
FIG. 13 shows a connection server according to one embodiment.

FIG. 13 shows a connection server according to one embodiment. In FIG. 13, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 13, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) air processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media set per. The media server tray include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 12 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the calico to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, ..., 369) and media servers (371, 373, ..., 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media server fir interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment contact mapping are cached in the local memory (e.g., RAM) of the servers for improved performance; and the cached mapping is updated when the database is updated.

Figure 14:
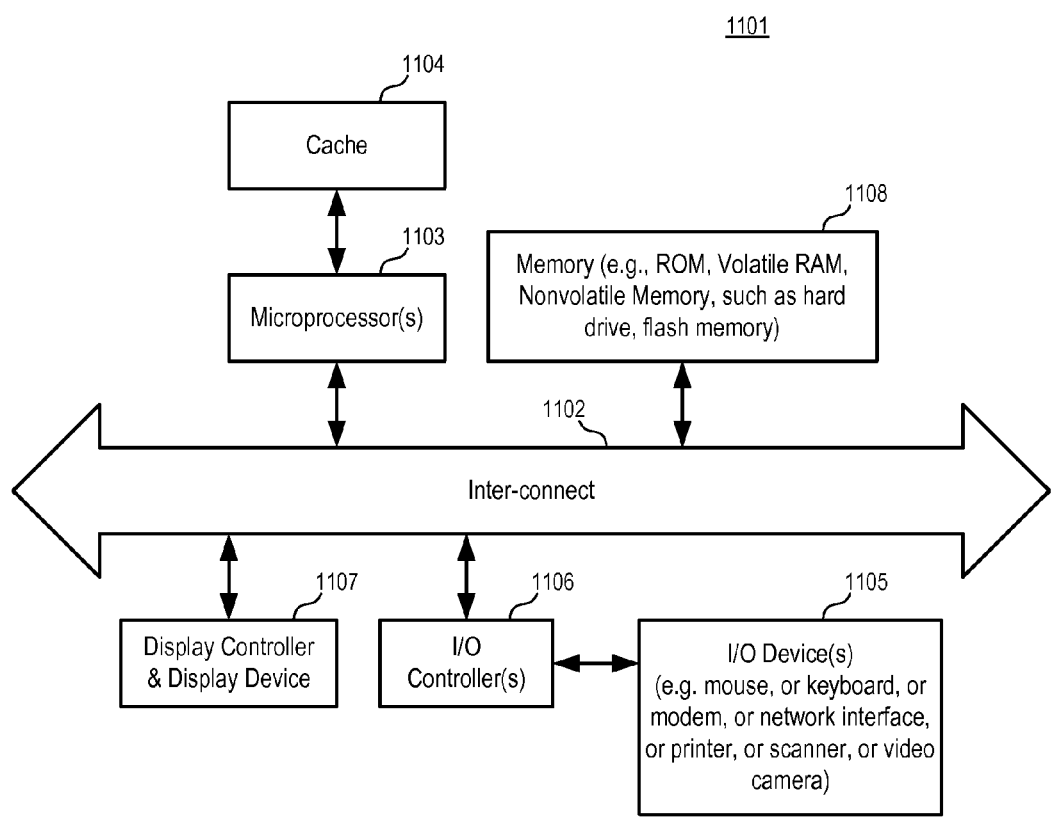
FIG. 14 shows a block diagram example of a data processing system which may be used in various embodiments.

FIG. 14 shows a block diagram example of a data processing system which may be used in various embodiments. While FIG. 14 illustrates various components of a computer system, it is not intended to represent any particular architecture or manner of interconnecting the components. Other systems that have fewer or more components may also be used.

In FIG. 14, the communication device (1101) is a form of a data processing system. The system (1101) includes an inter-connect (1102) (e.g., bus and system core logic), which interconnects as microprocessor(s) (1103) and memory (1108). The microprocessor (1103) is coupled to cache memory (1104) in the example of FIG. 14.

The inter-connect (1102) interconnects the microprocessor(s) (1103) and the memory (1108) together and also interconnects them to a display controller and display device (1107) and to peripheral devices such as input/output (I/O) devices (1105) through an input/output controller(s) (1106). Typical I/O devices include mice, keyboards, modems, network interfaces, printers, scanners, video cameras and other devices which are well known in the art.

The inter-connect (1102) may include one or more buses connected to one another through various bridges, controllers and/or adapters. In one embodiment the I/O controller (1106) includes a USB (Universal Serial Bus) adapter for controlling USB peripherals, and/or an IEEE-1394 bus adapter for controlling IEEE-1394 peripherals.

The memory (1108) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as at modem or Ethernet interface, can also be used.

In one embodiment, a server data processing system as illustrated in FIG. 14 is used as one of the communication server(s), virtual reality server(s), connection server(s), database server(s), media server(s), controller(s), router(s), gateway(s), etc.

A user terminal as a client system can be a data processing system similar to the system of FIG. 14. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

FIG. 15 shows a user interface to present answers to facilitate real time communications and content transaction according to one embodiment. In FIG. 15, a user may enter a search term in the entry box (723) to search for existing questions related to a topic or keyword. In one embodiment, both the questions and the answers to the questions can be matched in searching the questions according to the search term provided in the entry box (723).

In another embodiment, the user can also browser a directory of topics to visually search for questions of interest.

In FIG. 15, a question (701) (e.g., "Can VC invest in an LLC or would another form of incorporation be required in order to receive venture funding?") is displayed according to a user selection from a prior search request (or from browsing the hierarchical directory of topics and selecting the question from the questions listed under the topics).

In FIG. 15, the question (701) is presented with information (703) about the user (Lui Magarian) who posted the question. For example, a link (705) to other questions of the user (Lui Magarian) can be selected to view more information about the user (Lui Magarian). For example, when the link (705) is selected, a public profile page of the user (Lui Magarian) may be presented with a list of other questions that have been asked by the user (Lui Magarian). Alternatively, when the link (705) is selected, the list of questions of the user may be presented with further links to the profile information of the user (Lui Magarian) or, alternatively, without profile information about the user (Lui Magarian).

In some embodiments, the information (703) about the user (Lui Magarian) can further include an indication of a social distance and/or a social connection path between the user (Lui Magarian) the viewer of the user interface (not shown in FIG. 15).

In FIG. 15, credentials (726) earned by the user (Lui Magarian) is also presented. For example, FIG. 15 shows a link to the best answers of the user (Lui Magarian) (e.g., best answers as selected by those who asked the corresponding questions, or as voted by viewers who have reviewed the answers).

In FIG. 15, the communication references (725 and 727) are presented to allow the viewer to request communication connections with the user (Lui Magarian). For example, the icon button (725) can be selected to request a telephonic connection with the user (Lui Magarian) at a rate (e.g., $1.5 per min) that is specified by the user (Lui Magarian). The user of the interface illustrated in FIG. 15 may want to talk to the user (Lui Magarian) about the knowledge related to the question, or for advises in areas that the user (Lui Magarian) have earned credentials (726), or for other purposes (e.g., recommendations, suggestions, entertainment, amusement, etc.). For example, a caller may call the user (Lui Magarian) to pitch for a service or product related to the question.

In one embodiment, the communication references (725 and 727) are automatically presented by the system, according to the permission or preference of the user (Lui Magarian). In one embodiment, the communication references (725 and 727) are obtained by the user (Lui Magarian) from a connection provider and provided to the question and answer system when posting the question.

In one embodiment, after the icon button (725) is selected, a connection server is to call back at a telephonic reference of the user of the interface to make a connection to the user (Lui Magarian). Alternatively, the icon button (725) can be configured to cause a VoIP call initiated from the user terminal that presents the user interface illustrated in FIG. 15. Alternatively, the user interface may be displayed on a telephonic apparatus, connected to a landline or capable to connected to a cellular communication network; and the selection of the icon button (725) can cause the telephonic apparatus to dial a call according to a telephone number embedded in, or associated with, the icon button (725). Alternatively, the selection of the icon button (725) can cause the user interface to reveal a telephone number of a connection server which can be dialed to call the connection server and request the connection server to connect the call to the user (Lui Magarian).

In one embodiment, the caller is provided a free time period for the telephonic connection with the user (Lui Magarian) until the caller indicates the acceptance of the charge. In another embodiment, the connection server connects the caller to the user (Lui Magarian) after the caller accepts the charge.

For example, the icon button (727) can be used to request for a mail connection with the user (Lui Magarian). In one embodiment, the connection server sends the mail electronically to the user (Lui Magarian) as if the mail is from the connection server to prevent the recipient from getting the electronic mailing address of the sender (e.g., for the privacy of the sender). A reference embedded in the delivered mail can be used to request the connection server to send a response in the same anonymous way.

In FIG. 15, a list of existing answers to the question is provided with corresponding information about the users who provided the corresponding answers. For example, a user (Rob Berman) may provide an answer (714) ("A VC can invest in any type of corporate structure. However, that being said it will be harder to develop an exit strategy for the VC with an LLC versus a C-Corp.").

Figures 17, 18:
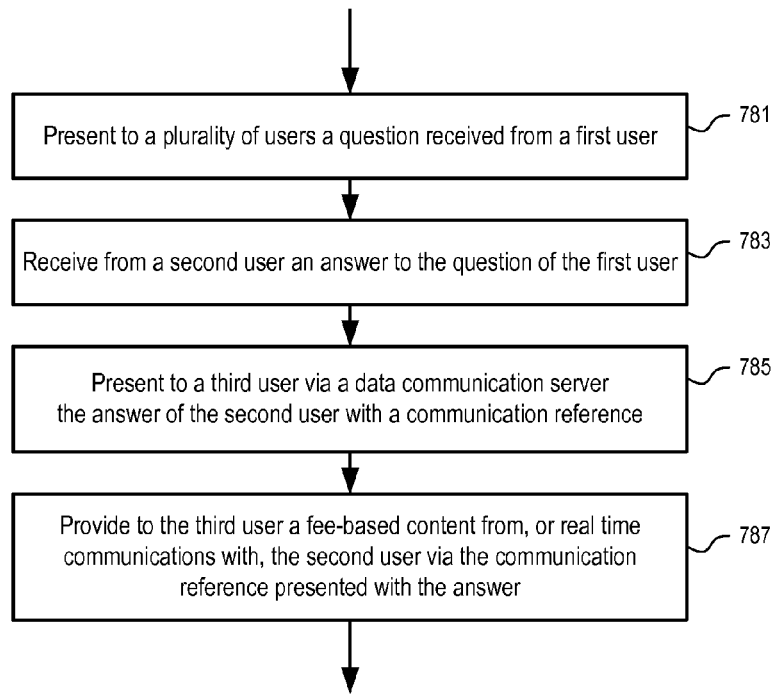
FIG. 17 shows a user interface to provide fee-based content to a user according to one embodiment.
FIG. 18 shows a method to facilitate commerce via answers according to one embodiment.

In FIG. 15, information (711) is displayed about the user (Rob Berman) who provided the answer (714) to facilitate communications with the user (Rob Berman) and the transaction of a fee-based content. For example, information (711) may include the credentials of the user (Rob Berman) (e.g., having provided 3 best answers in the category of "staring up" and 1 best answers in the category of "accounting"). The information (711) further include an icon button (715) which can be used to request a telephonic connection with the user (Rob Berman) at the rate of $30 per 15 minutes and an icon button (717) for a mail connection. The connections can be provided in similar ways as described above related to the icon buttons (725 and 727). In one embodiment, the mail connection allows the user (Rob Berman) to charge a price for pay-to-view content, as illustrated in FIG. 17.

In FIG. 15, the user (Rob Berman) can also include an answer that requires a payment to view. An introduction (716) to the fee-based answer is presented with a price (e.g., $5.00) and an icon button (719) to buy the fee-based answer. Alternatively, the public answer (714) can be used as the introduction part of the fee-based answer.

In one embodiment, the user interface further presents the user feedback information about the fee-based answers. For example, the average rating (718) from the prior customers who purchased the fee-based answer is displayed with statistical data about the fee-based answers in the example of FIG. 15. For example, the number of prior customers who purchased the fee-based answers, the number of comments from prior customer, etc., can be displayed to assist the viewer in making a purchase decision.

In one embodiment, when the icon button (719) is selected, a copy of the fee-based answer is mailed electronically to the requester; and the fee-based answer can be viewed in an application for electronic mails after payment for the fee-based answer is received. In one embodiment, the selection of the icon button (719) also brings the customer to the application for electronic mails, as illustrated in FIG. 17.

In another embodiment, the selection of the icon button (719) causes the user interface to further display a user interface to verify payment information; after the payment is received, the fee-based answer is displayed or mailed electronically to the requester.

In one embodiment, the system allows the person who provides the answer to offer fee-based content related to the question and answers in various ways. For example, the fee-based content can be a text description, or a graphical document, or a multimedia presentation.

In FIG. 15, the user interface presents an offer (721) of a fee-based content related to the answer provided by the user (Furqn Naz) (713). The content is in an audio form, priced based on a time period a customer actually listens to the content (e.g., $0.75 per minute). In one embodiment, when the icon button (721) is selected, a telephonic connection to a media server is established (e.g., via a VoIP call from the user terminal, via a cellular phone call or a landline phone call to a server, or via a server calling back to the user). After the payment is received or verified, the media server plays the recording back to the customer over the telephone connection.

In another embodiment, the audio and/or video content is streamed over Internet to the requester when the icon button (721) is selected. In a further embodiment, a multimedia file is downloaded to the requester after the icon button (721) is selected.

In one embodiment, the payment information is verified prior to the presentation of the questions and answers. The customer is charged according to the payment information when the customer selects the icon buttons (e.g., 718, 721) for purchases. The payment information may be a credit card account, a debit card account, a bank account, a member account of the customer established with the service provider, etc. In one embodiment, the payment information includes a telecommunication service account (e.g., a cellular phone account, a VoIP user account an instant messaging account, a landline telephone account, etc.); and the purchase made by the customer is billed to the telecommunication service account of the customer.

In another embodiment, the payment information is verified after the viewer selects the buttons (e.g., 719, 721, 725, or 715).

In FIG. 15, the user interface includes an icon button (707) selectable to request a user interface for providing answers to the question (701) and an icon button (709) to suggest an expert for the question (701).

FIG. 16 shows a user interface to receive answers from a user according to one embodiment. In FIG. 16, the question to be answered is presented (731). The user of the interface can provide a variety of answers, such as a public answer, a fee-based text answer, an audio answer. Further, the user may specify whether the user allows the system to provide communication connections for a live answer, a mail connection, etc.

In FIG. 16, the user can provide a public text answer in the text entry box (733). The public answer is presented without a charge to its viewer. In one embodiment, the access to the public answer is limited to members who have registered with the system. Being a registered member may or may not require a membership fee or subscription fee. In another embodiment, non-members can also access the public answers.

In one embodiment, the user may also provide a fee-based content that is related to the question and/or the public answer. For example, in FIG. 16, the user can specify the price (735) of the fee-based content, an introduction (737) of the fee-based content, and the text-based pay-to-view content (739). Alternatively or in combination, the user can upload (741) one or more files that contain the pay-to-view content (e.g., graphical, audio, video, or executable files).

In one embodiment, the text entry boxes (733 and 739) also support a level of formatting (e.g., via rich text editor or via tags, such as HTML tags).

In FIG. 16, the user can specify an audio answer (e.g., a fee-based content recording related to the question and/or the public answer). The user can specify the price (743) for listening to the audio answer. The audio answer can be updated (747) via an audio file, or recorded (745) over a telephonic connection with a media server. In one embodiment, after the link (745) is selected, the user is called back over a telephone line to provide the content; and the media server records the content in real time as the user speaks over the telephone connection. In another embodiment, after the link (745) is selected, a VoIP connection (e.g., a VoIP-based telephone call or a voice based instant messaging connection) is established from the user terminal to the media server for a recording of the fee-based content.

In FIG. 16, the user can also specify whether the user allows (749) the system to provide connections for real time communication with the user. For example, when a user specifies the price (753) and enables (749) the live answer option, the icon button (e.g., 715) is displayed to a viewer of the public answer, which allows the viewer to request for a connection for live answers.

Alternatively, a user interface may accept the specification of a link to a call button (e.g., 715). The link points to a server of a connection provider, which provides the icon image of the call button based on the current availability status of the callee. In one embodiment, the server of the connection provider also provides the price information and/or other information such as a description of the callee, customer feedback, rating, comments about the callee, etc.

In FIG. 16, the user can also specify whether the user allows (751) the system to provide mail connections to the user. For example, when a user enables (749) the live answer option, the icon button (e.g., 717) is displayed to a viewer of the public answer, which allows the viewer to request for a mail connection to the user. Alternatively, a user interface may be designed to accept the specification of a link to a mail button (e.g., 717).

FIG. 17 shows a user interface to provide fee-based content to a user according to one embodiment. In FIG. 17, the user interface for accessing electronic mail includes a subject line (761) and the price (765) for viewing the content. In one embodiment, after the user selects the subject line (761), the user is prompted to accept the price (765). If the user declines the offer, the electronic mail is deleted from the account of the user; if the user accepts the offer, the system charges the user on behalf of the sender and presents the content. In one embodiment, after the payment, the user can subsequently use the mail application to view the content multiple times.

In one embodiment, the interface illustrated in FIG. 17 is implemented using a web page; alternatively, a similar interface can be implemented as a client mail application running on the user terminal of the user.

In FIG. 17, the sender is identified via a member ID of the sender. The link (763) can be selected to visit the public profile page of the sender.

Alternatively, the system may not even provide the member ID of the sender. The link (763) can be selected by the user to specify information about the sender collected by the user. For example, the user may specify a nick name for the sender using the interface presented after the link (763) is selected. For example, the user may record a comment about the sender.

In one embodiment, the introduction (e.g., 737) is sent as the subject line in delivering the fee-based content to the recipient. In one embodiment, a portion of the introduction is sent as the subject line; and after the subject line is selected, the entire introduction is displayed in an interface that asks the viewer to confirm or reject the offer.

In one embodiment, after a "buy now" button (e.g., 719) in the answer section is selected, the user interface for the mail application, as illustrated in FIG. 17, is presented to access the fee-based content.

FIG. 18 shows a method to facilitate commerce via answers according to one embodiment. In FIG. 18, a plurality of users is presented (781) with a question received from a first user. After an answer to the question of the first user is received (783) from a second user, the answer of the second user is presented (785) with a communication reference to a third user via a data communication server. Via the communication reference presented with the answer, a fee-based content from the second user, or real time communications with the second user, is provided (787) to the third user.

In one embodiment, the communication reference is a link to a server to provide content related to the answer to the third user in text, audio or video after a payment is received from the third user.

In another embodiment, communication reference is a link to a server to request a callback to the third user over a telephone line to play back a recorded message of the second user related to the answer after a payment is received from the third user.

In a further embodiment, the communication reference is as telephonic reference of a server to be used by the third user to call the server to listen to a recorded message of the second user related to the answer after a payment is received from the third user.

In a furthermore embodiment, the communication reference is a link to a server to electronically mail content provided by the second user related to the answer to the third user and to present a mail application to the third user; and the mail application is configured to present the content to the third user after a payment is received from the third user.

In one embodiment, the communication reference is a reference of a connection server, such as a telephone number of the connection server without an extension, a telephone number of the connection server with an extension, a Session Initiation Protocol (SIP) Uniform Resource Identifier (URI) of connection server, a Voice over Internet Protocol (VoIP) user identifier of the connection server, or a link to a web server of the connection server to request a callback to the third user for a connection to the second user.

In one embodiment, the connection server is to establish a first Voice over Internet Protocol (VoIP) connection to connect to the third user via the communication reference, determine a telephonic reference of the second user based on the communication reference used to establish the first VoIP connection, establish a second Voice over Internet Protocol (VoIP) connection to connect to the second user using the determined telephonic reference of the second user, and cause the bridging of the first and second VoIP connections to connect the second user and the third user for real time communications.

In one embodiment, the bridging of the first and second VoIP connections includes translating between a first language and a second language to bridge communication between the second user and the third user.

In one embodiment, the bridging of the first and second VoIP connections includes translating between text and voice to bridge communication between the second user and the third user.

In one embodiment, the bridging of the first and second VoIP connections includes establishing a media connection that does not go through the connection server to connect the second user and the third user.

In one embodiment, connection server charges the third user on behalf of the second user for the real time communications between the second user and the third user. For example, the connection server may charge the third user via a credit account, a debit account, a bank account, a member account of the third user established with the connection server, or a telecommunication account of the third user established with a telecommunication carrier and the connection server may charge the third user based on a price per session specified by the second user, a price per unit of communication time specified by the second user, or credits associated with a subscription fee (e.g., the number of minutes allocated for a subscription period, a number points allocated for a subscription period, etc.)

In one embodiment, a user interface is provided to the second user to receive the answer to the question, a content related to the question, and a price for the content. In one embodiment, the user interface is configured to receive the content via an entry box, a file attachment, or a voice connection between the second user and a recording server.

In one embodiment, a credential of the second user in an area related to the question is presented together with an offer of a content related to the question, a rating of the content by prior customers and a number of prior sells of the content to promote the content.

From this description, it will be appreciated that certain aspects are embodied in the user devices certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

The invention claimed is:

1. A system comprising one or more memory storage areas and one or more processors, the system configured to:
provide for presentation of a question to a plurality of users, the question originating from a first user of the plurality of users;
receive a first answer and a second answer to the question, the first answer and the second answer originating from a second user of the plurality of users;
access relationship data corresponding to a social network of which the second user and a third user are members, wherein (a) the social network comprises a social structure that represents a network of users, (b) the relationship data comprises connections between the users that represent social connections, and (c) a social distance between any two users is determined based at least in part the social structure and the connections between the any two users;
based at least in part on the relationship data, rank the second user according to a social distance between the second user and a third user with respect the social network; and
provide for presentation of the first answer and the second answer (a) with a communication reference of the second user to the third user and (b) with an identification of the ranking of the second user according to the social distance, wherein:
the second answer is (a) an introductory answer for a fee-based answer, and (b) presented with a user-selectable option to view the fee-based answer;
the communication reference is operative to request real-time, fee-based communications between the third user and the second user in response to a request made via the communication reference by selection of the communications reference by the third user; and
the third user is charged a fee for the real-time, fee-based communications between the third user and the second user.

2. The system of claim 1, wherein the system is further configured to establish a first Voice over Internet Protocol connection to connect to the third user via the communication reference, to establish a second Voice over Internet Protocol connection to connect to the second user, and to bridge the first and second Voice over Internet Protocol connections to connect the second user and the third user for real-time communications.

3. The system of claim 2, wherein the first and second Voice over Internet Protocol connections are bridged via a media connection that does not go through a session border controller to connect the second user and the third user.

4. A method, comprising:
providing, by a computing device, for presentation of a question to a plurality of users, the question originating from a first user of the plurality of users;
receiving, by a computing device, a first answer and a second answer to the question, the first answer and the second answer originating from a second user of the plurality of users;
accessing relationship data corresponding to a social network of which the second user and a third user are members, wherein (a) the social network comprises a social structure that represents a network of users, (b) the relationship data comprises connections between the users that represent social connections, and (c) a social distance between any two users is determined based at least in part the social structure and the connections between the any two users;
based at least in part on the relationship data, ranking the second user according to a social distance between the second user and a third user with respect the social network; and
providing, by a computing device, for presentation of the first answer and the second answer (a) with a communication reference of the second user to the third user and (b) with an identification of the ranking of the second user according to the social distance, wherein:
the second answer is (a) an introductory answer for a fee-based answer, and (b) presented with a user-selectable option to view the fee-based answer;
the communication reference is operative to request real-time, fee-based communications between the third user and the second user in response to a request made via the communication reference by selection of the communications reference by the third user; and
the third user is charged a fee for the real-time, fee-based communications between the third user and the second user.

5. The method of claim 4, wherein the communication reference comprises a link to a server to provide content related to the first answer to the third user in one or more of text, audio, and/or video after a payment of a fee is received from the third user.

6. The method of claim 4, wherein the communication reference comprises a link to a server to request a callback to the third user over a telephone line to play back a recorded message of the second user related to the first answer after a payment of a fee is received from the third user.

7. The method of claim 4, wherein the communication reference comprises a telephonic reference of a server to be used by the third user to call the server to listen to a recorded message of the second user related to the first answer after a payment of a fee is received from the third user.

8. The method of claim 4, wherein the communication reference comprises a link to a server to electronically mail content provided by the second user related to the first answer to the third user and to present a mail application to the third user; and wherein the mail application is configured to present the content to the third user after a payment of a fee is received from the third user.

9. The method of claim 4, wherein the communication reference comprises a reference of a connection server, comprising one or more of a telephone number of the connection server without an extension, a telephone number of the connection server with an extension, a Session Initiation Protocol Uniform Resource Identifier of the connection server, a Voice over Internet Protocol user identifier of the connection server, and/or a link to a web server of the connection server to request a callback to the third user for a connection to the second user.

10. The method of claim 9, further comprising:
establishing a first Voice over Internet Protocol connection to connect to the third user via the communication reference;
determining a telephonic reference of the second user based on the communication reference used to establish the first Voice over Internet Protocol connection;
establishing a second Voice over Internet Protocol connection to connect to the second user using the determined telephonic reference of the second user; and
bridging the first and second Voice over Internet Protocol connections to connect the second user and the third user for real-time communications.

11. The method of claim 10, wherein the bridging of the first and second Voice over Internet Protocol connections comprises establishing a media connection that does not go through a connection server to connect the second user and the third user.

12. A non-transitory computer readable storage medium storing instructions that, when executed by one or more systems and/or one or more computing devices, cause the one or more systems and/or the one or more computing devices to perform a method, the method comprising:
providing for presentation of a question to a plurality of users, the question originating from a first user of the plurality of users;
receiving a first answer and a second answer to the question, the first answer and the second answer originating from a second user of the plurality of users;
accessing relationship data corresponding to a social network of which the second user and a third user are members, wherein (a) the social network comprises a social structure that represents a network of users, (b) the relationship data comprises connections between the users that represent social connections, and (c) a social distance between any two users is determined based at least in part the social structure and the connections between the any two users;
based at least in part on the relationship data, ranking the second user according to a social distance between the second user and a third user with respect the social network;
providing for presentation of the first answer and the second answer (a) with a communication reference of the second user to the third user and (b) with an identification of the ranking of the second user according to the social distance, wherein:
the second answer is (a) an introductory answer for a fee-based answer, and (b) presented with a user-selectable option to view the fee-based answer;
the communication reference is operative to request real-time, fee-based communications between the third user and the second user in response to a request made via the communication reference by selection of the communications reference by the third user; and
the third user is charged a fee for the real-time, fee-based communications between the third user and the second user.

13. The non-transitory computer readable storage medium of claim 12, wherein the communication reference comprises a link to a server to provide content related to the first answer to the third user in one or more of text, audio, and/or video after a payment of a fee is received from the third user.

14. The non-transitory computer readable storage medium of claim 12, wherein the communication reference comprises a link to a server to request a callback to the third user over a telephone line to play back a recorded message of the second user related to the first answer after a payment of a fee is received from the third user.

15. The non-transitory computer readable storage medium of claim 12, wherein the communication reference comprises a telephonic reference of a server to be used by the third user to call the server to listen to a recorded message of the second user related to the first answer after a payment of a fee is received from the third user.

16. The non-transitory computer readable storage medium of claim 12, wherein the communication reference comprises a link to a server to electronically mail content provided by the second user related to the first answer to the third user and to present a mail application to the third user; and wherein the mail application is configured to present the content to the third user after a payment of a fee is received from the third user.

17. The method of claim 4, wherein the communication reference comprises a reference of a connection server, comprising one or more of a telephone number of the connection server without an extension, a telephone number of the connection server with an extension, a Session Initiation Protocol Uniform Resource Identifier of the connection server, a Voice over Internet Protocol user identifier of the connection server, and/or a link to a web server of the connection server to request a callback to the third user for a connection to the second user.

18. The non-transitory computer readable storage medium of claim 17, the method further comprising:
establishing a first Voice over Internet Protocol connection to connect to the third user via the communication reference;
determining a telephonic reference of the second user based on the communication reference used to establish the first Voice over Internet Protocol connection;

establishing a second Voice over Internet Protocol connection to connect to the second user using the determined telephonic reference of the second user; and bridging the first and second Voice over Internet Protocol connections to connect the second user and the third user for real-time communications.

19. The non-transitory computer readable storage medium of claim 18, wherein the bridging of the first and second Voice over Internet Protocol connections comprises establishing a media connection that does not go through a connection server to connect the second user and the third user.

20. The system of claim 1, wherein the communication reference comprises a link to a server to provide content related to the first answer to the third user in one or more of text, audio, and/or video after a payment of a fee is received from the third user.

* * * * *